(12) United States Patent
Scribner et al.

(10) Patent No.: US 7,520,296 B2
(45) Date of Patent: Apr. 21, 2009

(54) DEVICE TO ADJUST AND CONTROL WATER LEVELS

(76) Inventors: James R. Scribner, 11111 Theirna St., Sun Valley, CA (US) 91352; Gail Ryan, 16310 Napa St., North Hills, CA (US) 91343

(*) Notice: Subject to any disclaimer, the term of this patent is extended or adjusted under 35 U.S.C. 154(b) by 315 days.

(21) Appl. No.: 11/435,792

(22) Filed: May 18, 2006

(65) Prior Publication Data

US 2006/0261178 A1 Nov. 23, 2006

Related U.S. Application Data

(60) Provisional application No. 60/682,418, filed on May 19, 2005.

(51) Int. Cl.
*F16K 31/18* (2006.01)
(52) U.S. Cl. .................. 137/424; 137/426; 137/434
(58) Field of Classification Search .......... 137/424, 137/426, 409, 434, 440; 239/12, 16, 17, 239/23, 25, 29, 32; 4/358, 397, 508; 441/3, 441/4, 5
See application file for complete search history.

(56) References Cited

U.S. PATENT DOCUMENTS

| 213,920 | A | * | 4/1879 | McKissock | 137/426 |
|---|---|---|---|---|---|
| 520,203 | A | * | 5/1894 | Claffey | 137/426 |
| 846,424 | A | * | 3/1907 | Pelmulder | 137/426 |
| 846,598 | A | * | 3/1907 | McKaig | 137/426 |
| 2,524,699 | A | * | 10/1950 | Friedl | 137/426 |
| 2,809,752 | A | * | 10/1957 | Leslie | 4/508 |
| 2,968,120 | A | | 1/1961 | Reed | |
| 3,030,028 | A | * | 4/1962 | Hruby, Jr. | 239/17 |
| 3,286,724 | A | * | 11/1966 | Sawyer | 137/426 |
| 3,943,889 | A | * | 3/1976 | Sparber | 119/73 |
| 3,996,960 | A | * | 12/1976 | Martinez-Lozano | 137/426 |
| 4,291,836 | A | | 9/1981 | Chen-Hsiung | |
| 4,586,532 | A | * | 5/1986 | Tsolkas | 137/426 |
| 6,029,899 | A | | 2/2000 | Walker | |
| 6,082,043 | A | | 7/2000 | Andrews | |
| 6,179,218 | B1 | * | 1/2001 | Gates | 239/17 |

* cited by examiner

*Primary Examiner*—John Rivell
*Assistant Examiner*—Craig Price
(74) *Attorney, Agent, or Firm*—Richard C. Litman

(57) ABSTRACT

The device to adjust and control water levels is an apparatus that functions to secure a float valve at the bottom of an outdoor fountain without permanent installation involving screws, nuts, bolts and the like. The device includes a solid body, a bracket and a decorative float. The bracket is easily assembled to the solid body and retains the body of the float valve submerged in the fountain.

5 Claims, 4 Drawing Sheets

# DEVICE TO ADJUST AND CONTROL WATER LEVELS

CROSS-REFERENCE TO RELATED APPLICATION

This application claims the benefit of U.S. Provisional Patent Application Ser. No. 60/682,418, filed May 19, 2005.

BACKGROUND OF THE INVENTION

1. Field of the Invention

The present invention generally relates to fluid flow control devices. More specifically, the present invention is drawn to float valve apparatus for maintaining the water level in an outdoor fountain.

2. Description of the Related Art

Having a water feature most certainly adds a bit of "feng shui" to a yard or garden. Thus, the outdoor fountain has become a popular decorative addition to the yard or garden. Unfortunately, having a beautiful fountain includes the attendant problem of maintaining the proper water level therein. Heretofore, the water level was maintained by manually filling the fountain with a hose or by transferring the water from a container. An alternative system utilizes a water feed line and an unsightly and permanently installed float control valve. The art would certainly welcome a system for maintaining the water level in an outdoor fountain utilizing non-permanent, easily installed equipment that would enhance the aesthetic appeal of the fountain.

Thus, a device to adjust and control water levels solving the aforementioned problems is desired.

SUMMARY OF THE INVENTION

The present invention is an apparatus that functions to secure a float valve at the bottom of an outdoor fountain without permanent installation involving screws, nuts, bolts and the like. The instant invention includes a solid body, a bracket and a decorative float. The solid body is heavy enough to remain in place at the bottom of the fountain. The bracket is easily secured to the solid body and functions to fit around the end of a float valve mechanism. The float valve mechanism is attached to a water conduit. A decorative float functions to activate the float valve mechanism to allow water to enter the fountain when the water level in the fountain recedes to a critical point Accordingly, the invention presents ,an apparatus that permits a user to maintain a proper water level in an outdoor fountain. The apparatus is easy to assemble and requires a minimum amount of maintenance. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
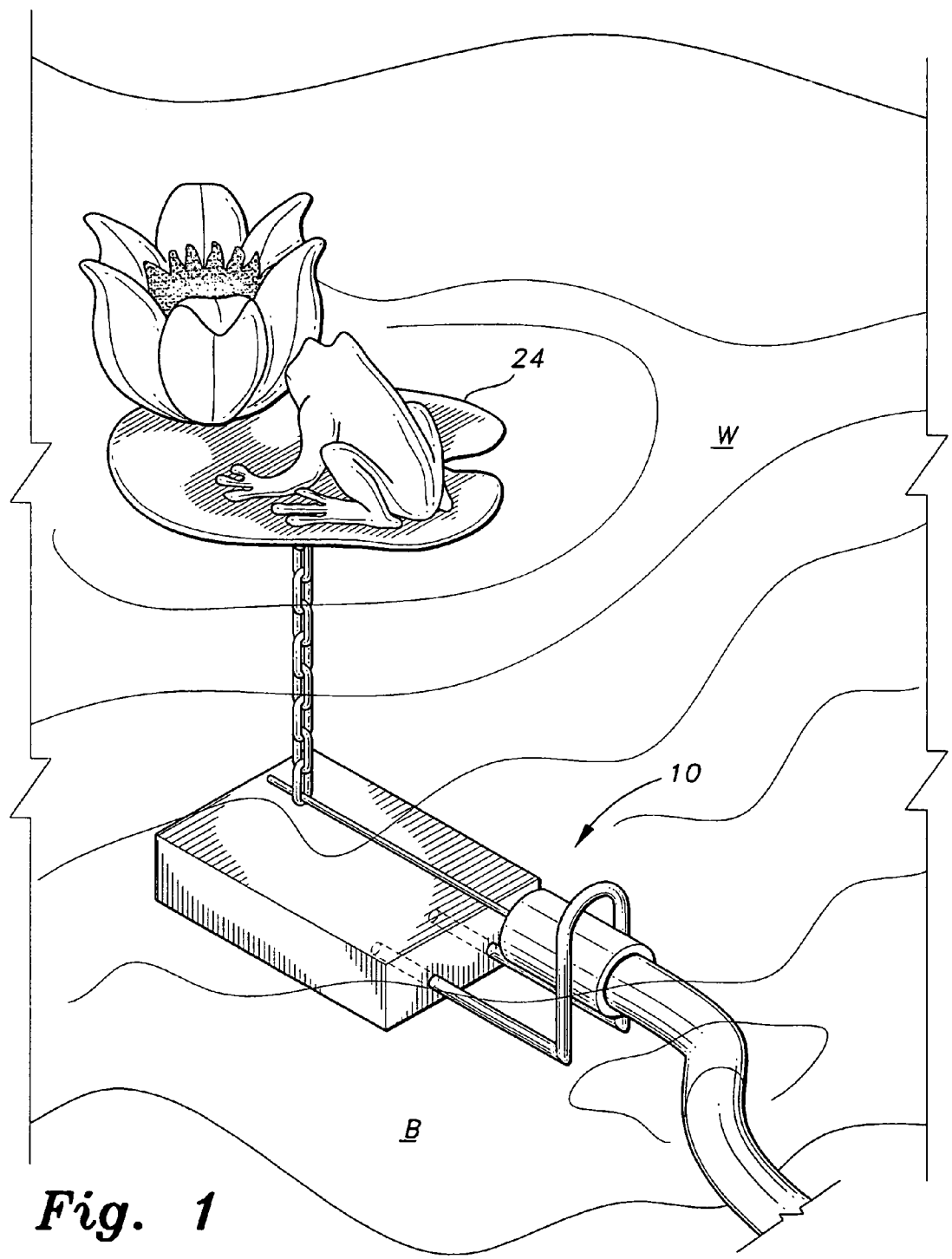
FIG. 1 is an environmental, perspective view of a device to adjust and control water level in a fountain according to the present invention.
Figure 2:
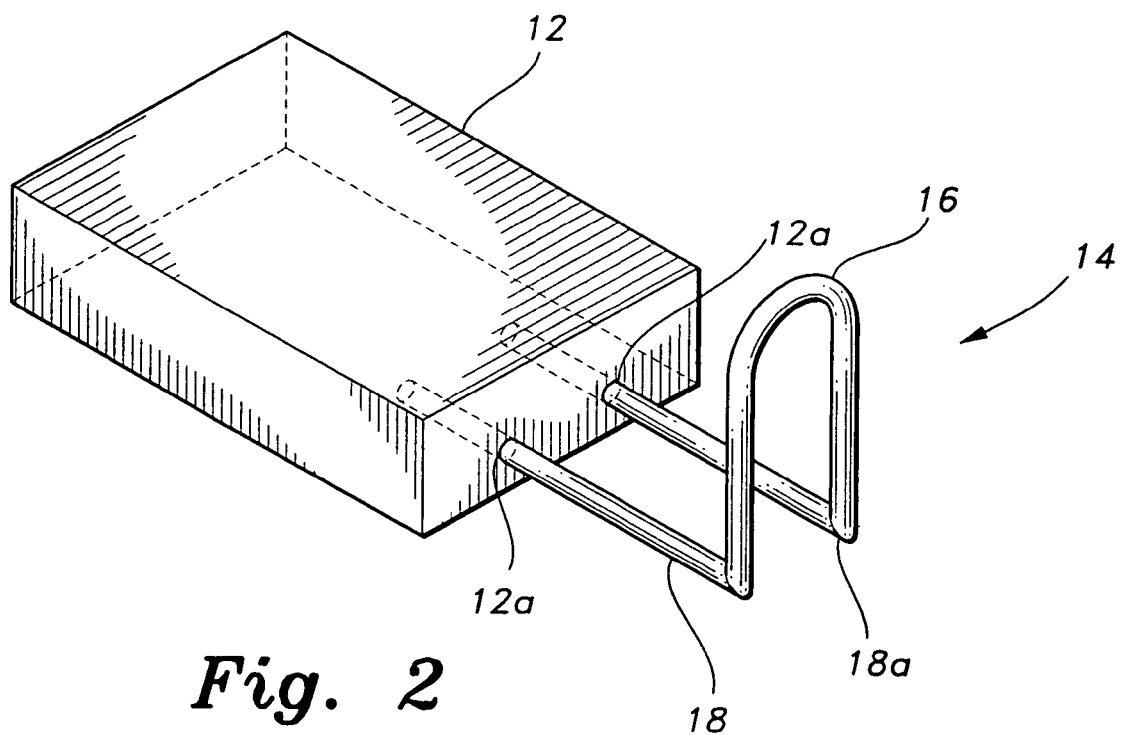
FIG. 2 is a perspective view of a device to adjust and control water level in a fountain according to the present invention.
Figure 3:
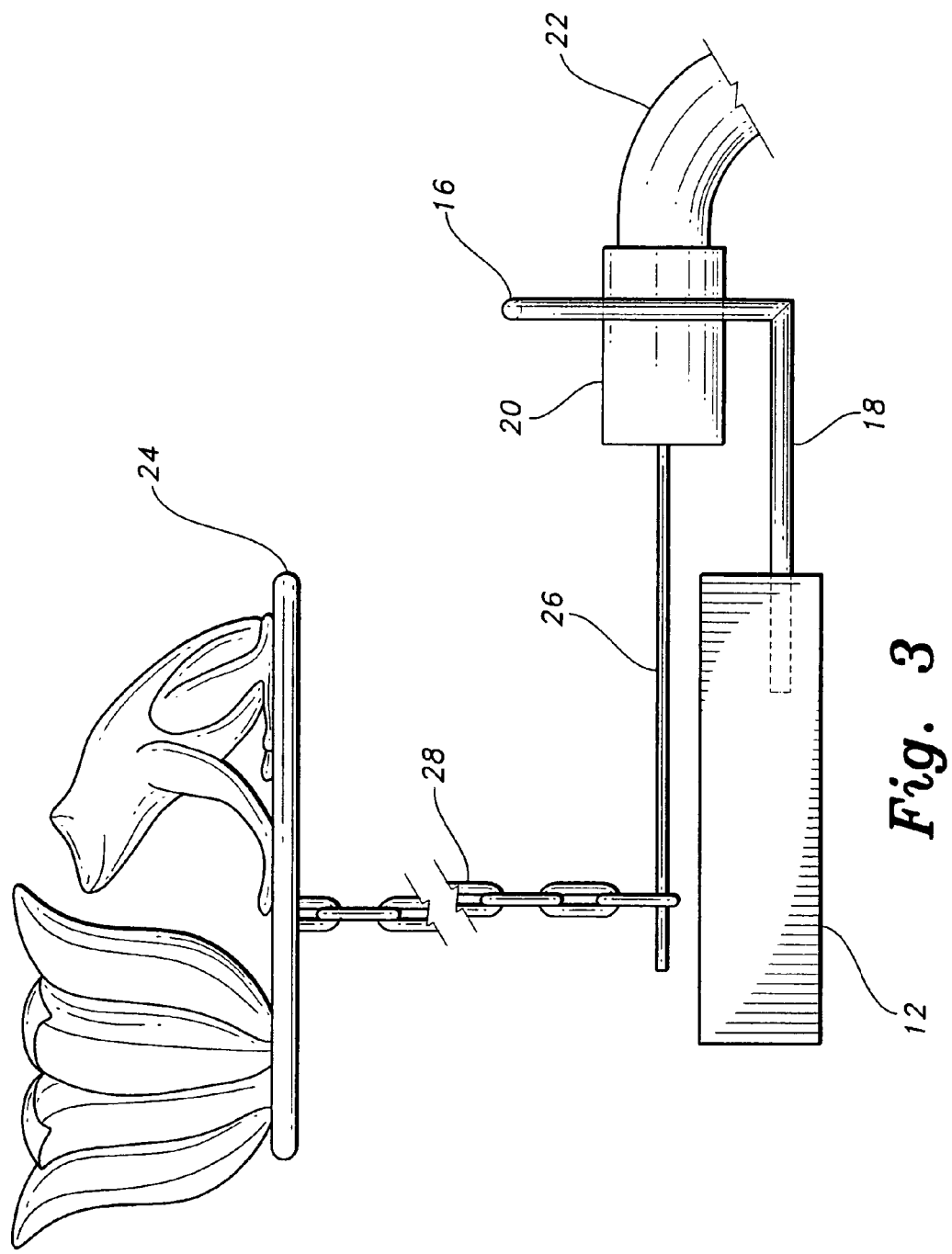
FIG. 3 is a side view of a device to adjust and control water level in a fountain according to the present invention.

Attention is first directed to FIG. 1 wherein the device of the instant invention is generally indicated at 10 and is shown positioned on the bottom B of a fountain beneath the surface the water W. As best seen in FIGS. 2 and 3, the device comprises a non-floatable body 12, i.e., a body having a density greater than water, fabricated from a metal. Body 12 will weigh at least 1 ½ pounds so that it will maintain its position submerged on the bottom B of the fountain. A bracket 14 is removably coupled to the body 12. Bracket 14 is a unitary body fabricated from a metal rod. Bracket 14 comprises a U-shaped end portion 16, which end portion has parallel legs 18, 18a extending perpendicularly therefrom. Openings 12a are formed in body 12 to receive legs 18, 18a therein. U-shaped portion 16 functions to retain a float valve 20 and water line 22 at the bottom of the fountain, e.g., by frictionally retaining the body of the float valve 20 between the arms of the U-shaped portion. A decorative float 24 is attached to float valve control arm 26 by means of a float chain 28. The float can be designed to assume a myriad of aesthetic water-themed forms.

Figure 4:
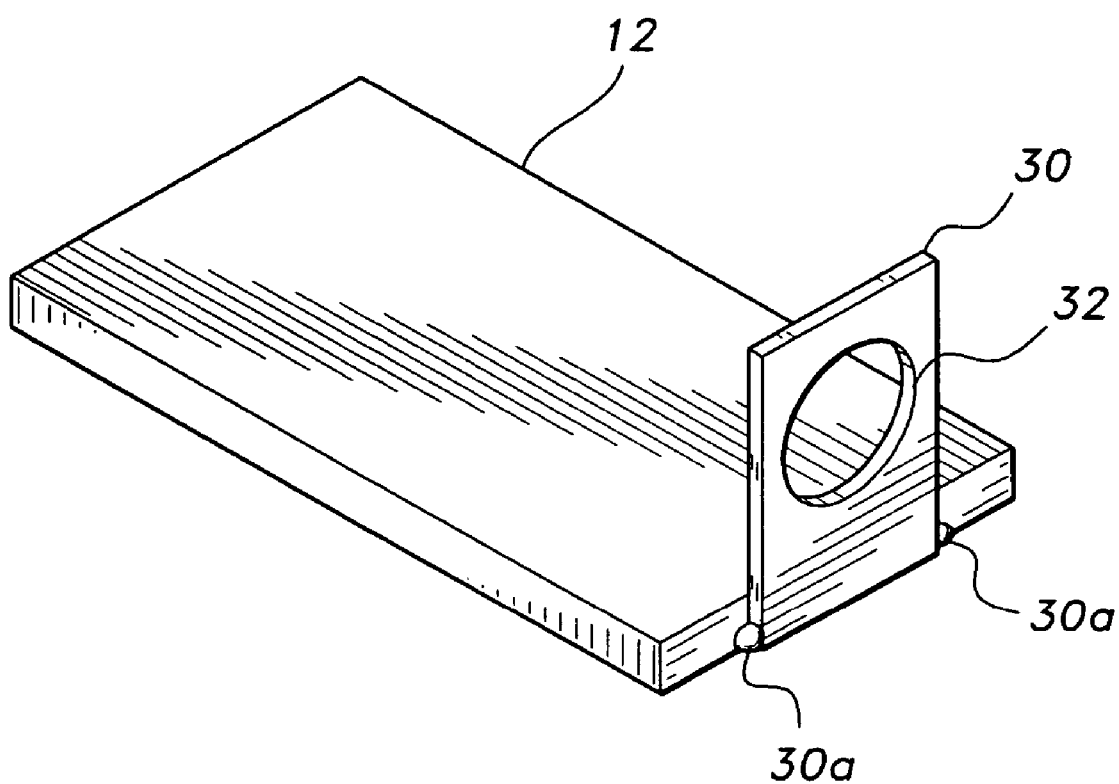
FIG. 4 is a perspective view of a second embodiment of a device to adjust and control water level in a fountain according to the present invention.

FIG. 4 illustrates a second embodiment of the invention. A solid metal plate 30 is spot welded at its lower edge 30a to the end wall of body 12. An opening 32 is disposed in plate 30 for retaining the float valve therein. This embodiment eliminates the wire bracket and is less costly to fabricate.

As discussed above, the apparatus permits a user to install a float valve assembly in a fountain or the like without the use of tools or any installation adjuncts. Although brass is the preferred metal of fabrication for body, bracket and chain it is obvious that other metals may be employed if desired.

It is to be understood that the present invention is not limited to the embodiment described above, but encompasses any and all embodiments within the scope of the following claims.

We claim:

1. A device to adjust and control water levels in a fountain, comprising:

a flow control valve having a valve control arm extending therefrom;

a body member having end walls, a top surface and a bottom surface, the body member having sufficient weight to remain submerged in water in the fountain and having said bottom surface configured to engage the fountain, one of the end walls having a pair of openings defined therein;

a bracket member, said bracket member being a unitary body fabricated from a rod and having a U-shaped end portion disposed in a first plane, wherein said flow control valve is slidably retained within the U-shaped end portion, said U-shaped end portion including a pair of legs extending in a second plane orthogonally in parallel from the U-shaped end portion, the pair of legs being removably received in the pair of openings;

a decorative float member; and a tether attaching the float member to the float valve control arm.

2. The device to adjust and control water levels as recited in claim 1, wherein said tether comprises a chain.

3. The device to adjust and control water levels as recited in claim 1, wherein said body member is fabricated from metal.

4. The device to adjust and control water levels as recited in claim 1, wherein said bracket member is fabricated from metal.

5. The device to adjust and control water levels as recited in claim 1, wherein said body member has a weight of at least 1.5 pounds.

* * * * *